United States Patent [19]

Caple

[11] Patent Number: 5,339,983
[45] Date of Patent: Aug. 23, 1994

[54] DUAL PAWL SPOOL FEEDER

[75] Inventor: Richard F. Caple, Janesville, Wis.

[73] Assignee: Multifastener Corporation, Detroit, Mich.

[21] Appl. No.: 64,289

[22] Filed: May 18, 1993

[51] Int. Cl.5 .......................................... G07F 11/66
[52] U.S. Cl. .................................... 221/25; 221/30; 221/32; 221/71; 221/104; 221/107; 221/238; 221/262; 221/268; 227/138; 414/222
[58] Field of Search ................ 221/25, 26, 30, 31, 221/32, 66, 70, 71, 103, 104, 107, 224, 225, 238, 239, 244, 245, 17, 262, 268; 29/432, 432.1, 798, 809, 818; 227/67, 136, 138; 414/417, 222

[56] References Cited

U.S. PATENT DOCUMENTS

| | | | |
|---|---|---|---|
| 828,682 | 8/1906 | Rodd | 221/268 X |
| 2,079,005 | 5/1937 | Freydberg | 221/70 |
| 2,230,829 | 2/1941 | Cesareo | 221/70 |
| 2,856,185 | 10/1958 | Whipple | 221/32 X |
| 3,089,360 | 5/1963 | Steward | 29/809 |
| 3,108,368 | 10/1963 | Steward | 29/432 |
| 3,114,477 | 12/1963 | Dixon | 221/262 X |
| 3,154,234 | 10/1964 | Cootes | 226/64 |
| 3,405,436 | 10/1968 | Koett | 29/432.1 |
| 3,483,833 | 12/1969 | Connor, Jr. | 221/262 X |
| 3,711,931 | 1/1973 | Ladouceur et al. | 29/432 X |
| 3,845,860 | 11/1974 | Ladouceur | 206/338 |
| 3,854,190 | 12/1974 | Stark | 29/432.1 |
| 3,961,408 | 6/1976 | Goodsmith | 29/208 |
| 3,984,030 | 10/1976 | Morini | 221/30 |
| 4,410,103 | 10/1983 | Fuhrmeister | 221/25 |
| 4,574,991 | 3/1986 | Thorsen, Jr. | 227/3 |
| 4,942,996 | 7/1990 | Wolfberg et al. | 227/136 |
| 4,981,246 | 1/1991 | Kennedy | 227/148 |
| 4,993,588 | 2/1991 | Willberg et al. | 221/268 X |
| 5,057,180 | 10/1991 | Mattiebe | 221/262 X |
| 5,090,591 | 2/1992 | Long | 221/30 X |

Primary Examiner—Robert P. Olszewski
Assistant Examiner—Dean A. Reichard
Attorney, Agent, or Firm—Howard & Howard

[57] ABSTRACT

A dual pawl, feed mechanism for feeding a strip of fasteners into an installation apparatus. The mechanism includes first and second pawls which are connected together and reciprocate in horizontal synchronism. The dual pawls enable a second strip of fasteners to be loaded into a chute before the first strip of fasteners is exhausted. This permits uninterrupted operation of the fastener installation apparatus irrespective of the transition between strips of fasteners. The dual feed pawl mechanism also prevents a partial feed condition from taking place.

6 Claims, 3 Drawing Sheets

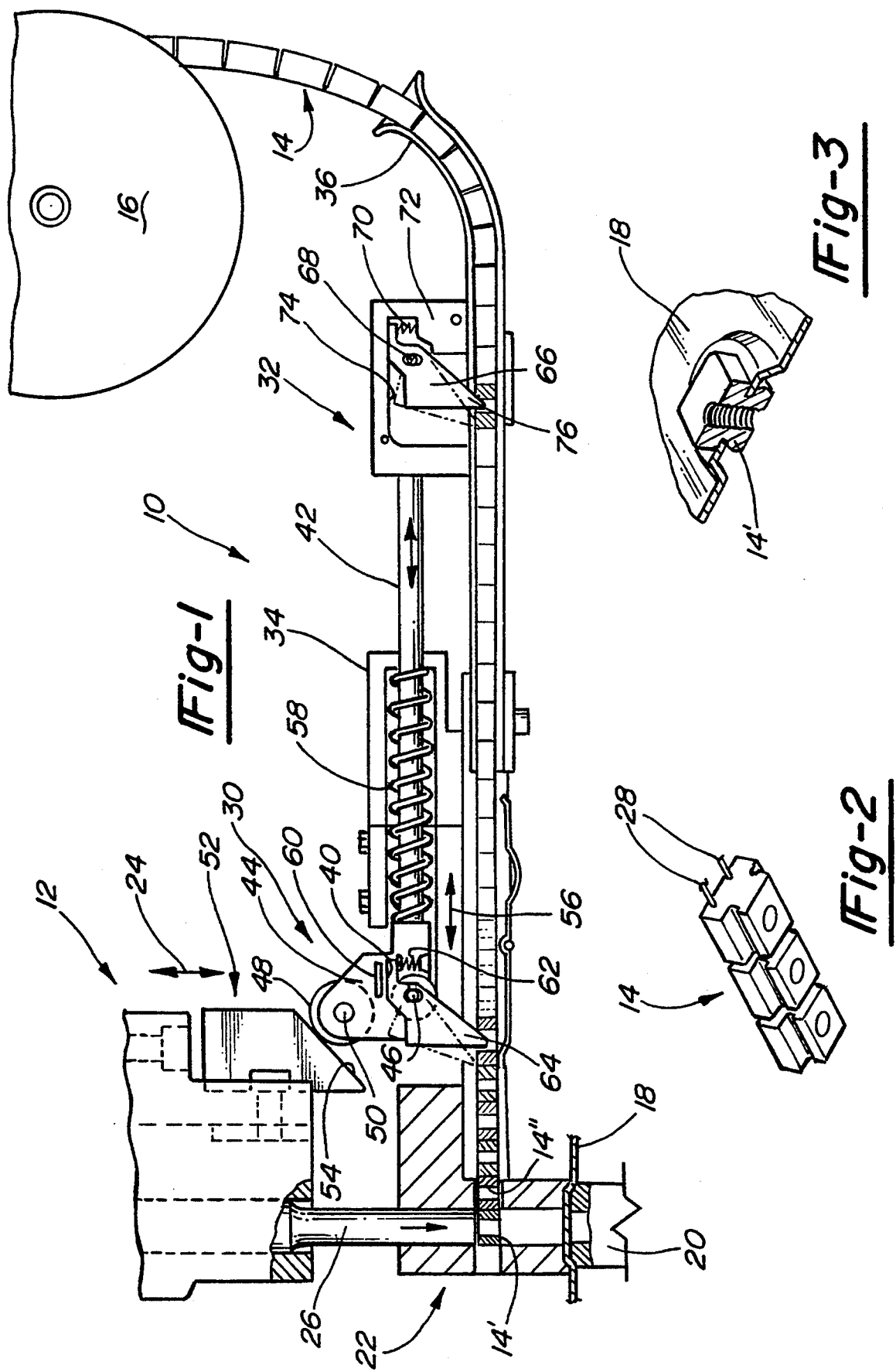

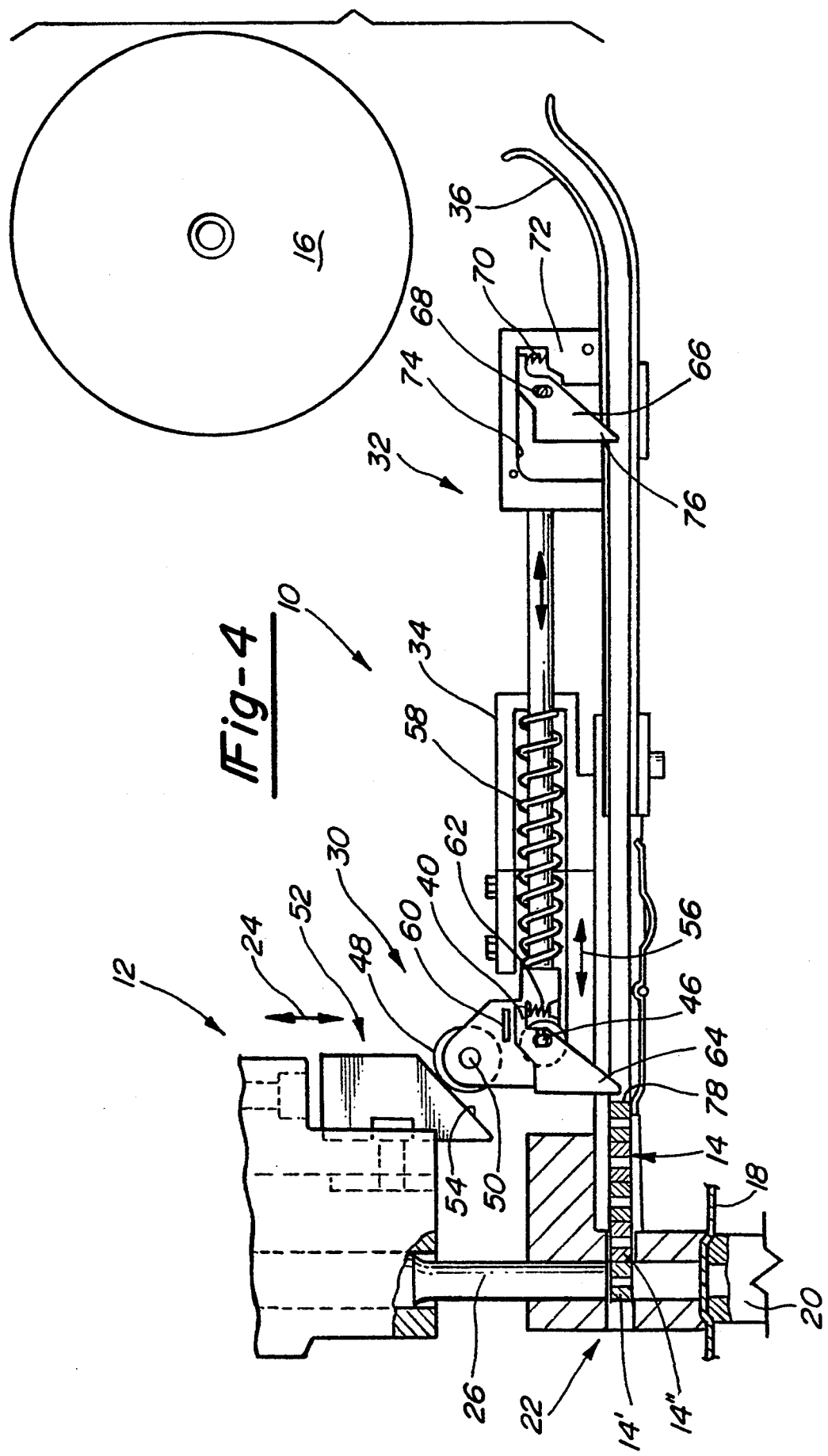

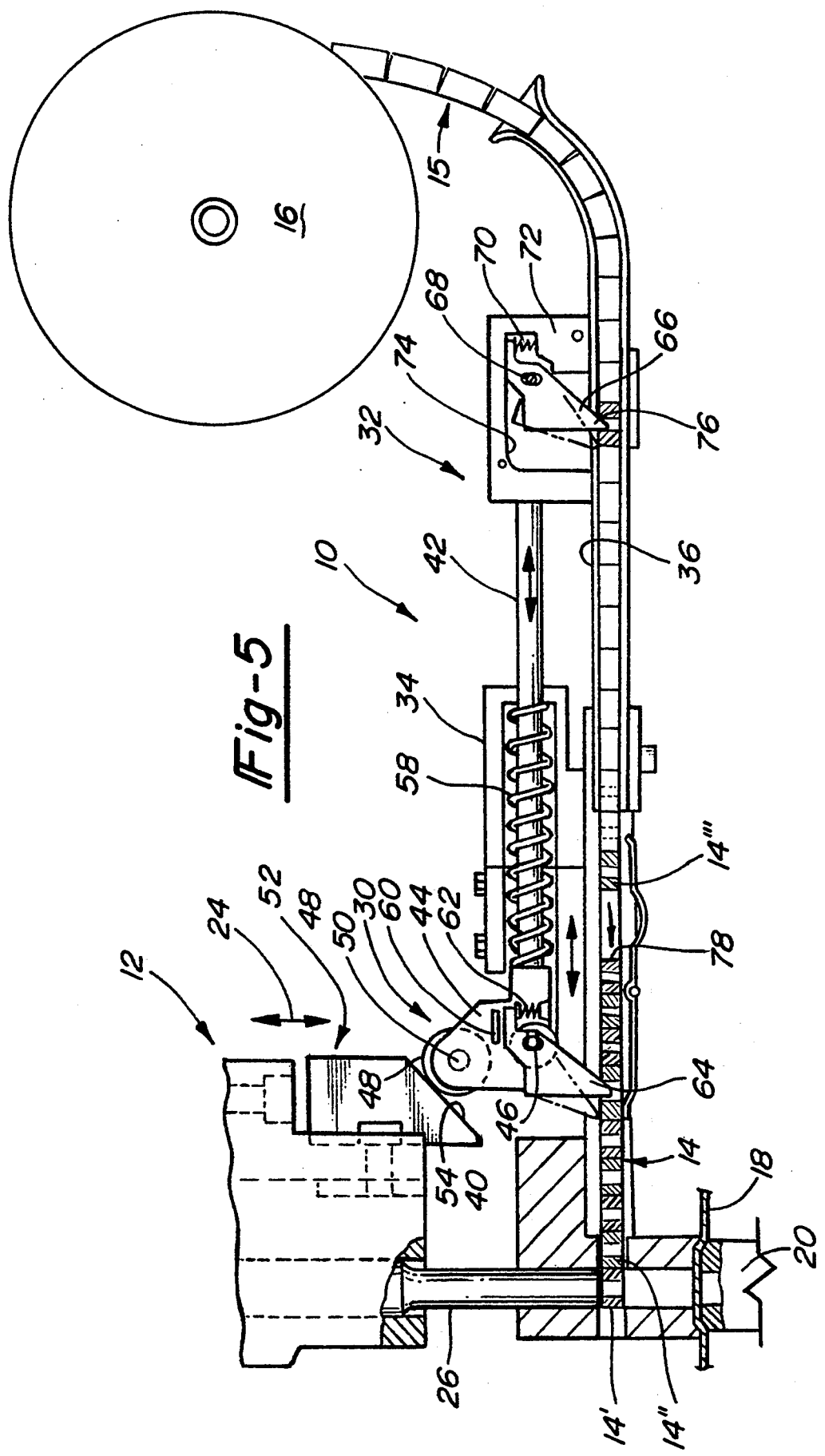

DUAL PAWL SPOOL FEEDER

BACKGROUND OF THE INVENTION

The present invention relates generally to a device for handling material, and more particularly relates to a feed system for feeding fasteners into a fastener installation apparatus.

Fasteners, such as pierce nuts disclosed in U.S. Pat. No. 2,707,322, are widely used in mass production applications such as in the automotive industry. In many instances, including mass production applications, it is advantageous to "string" (or join) fasteners together in a common orientation prior to feeding them into the installation apparatus. One advantage in joining fasteners to form a strip of fasteners is that it typically simplifies the design of the fastener feed system. U.S. Pat. No. 3,845,860 discloses a method for joining a plurality of fasteners into a strip of fasteners whereby each fastener in the strip of fasteners has a common orientation.

Although feeding an installation device with a strip of fasteners simplifies the design of the fastener feed mechanism, the strip of fasteners eventually terminates and, in order to keep the installation apparatus operating without interruption, a smooth transition must take place between the end of one fastener strip and the beginning of the next fastener strip. Prior art attempts to provide automatic transfer between strips of fasteners have proven inadequate to meet the demands of mass production applications.

Accordingly, it is an object of this invention to provide a feed mechanism capable of continuously feeding a strip of fasteners into an installation apparatus and also capable of continuous operation between first and second sets of fastener strips wherein the sets of fastener strips are not joined.

SUMMARY OF THE INVENTION

The present invention includes an apparatus for moving material along a chute. The apparatus includes first and second pawls each including a finger portion for engaging the material. The pawls are joined together by virtue of a rod extending there between. The pawls are pivotally connected to the rod and each enjoy pivotal movement independently of one another. A wheel, or the like, is attached to the rod for reciprocating the pawls relative to the chute. The finger portions of the pawls engage the material when it is located in the chute and the fingers move the material in a first direction along the chute when the pawls move in the first direction during one-half of their reciprocation stroke. During the remaining half of the reciprocation stroke the fingers of each pawl skip across the top of the material resulting in no movement of said material within the chute.

In a preferred embodiment a feed bias spring is provided for biasing the rod along the first direction and pawl biasing springs are included with each pawl for urging the respectively associated pawl against the material.

In a second aspect, the present application sets forth an apparatus for moving material, including first and second pawls each including a finger portion for engaging the material to be moved. The first and second pawls are pivotally connected to opposed ends of a connecting rod. The rod preferably includes a roller which is rotatingly coupled to the rod. A chute is provided for guiding the material wherein the first and second pawls are slidingly coupled to the chute. A drive means is utilized for reciprocating and for engaging the roller and causing the first and second pawls to reciprocate along the chute. When the first and second pawls move in a first direction during one-half of their reciprocation stroke, the finger portion of each pawl engages the material located in the chute and moves the material through the chute. During the remaining half of the reciprocation stroke, the pawls skip across the material resulting in no movement of material. Preferably, the drive means reciprocates generally transversely to the reciprocation of the first and second pawls.

BRIEF DESCRIPTION OF THE DRAWINGS

FIG. 1 is a cross sectional side view of the feed apparatus of the present invention feeding a strip of fasteners from a reel of fasteners into a continuous installation head.

FIG. 2 is an isometric view of a strip of fasteners, namely pierce nuts.

FIG. 3 is an isometric view of a fastener installed in a panel.

FIG. 4 is a cross sectional view of the feed apparatus of the present invention shown feeding a strip of fasteners into a continuous installation head wherein the strip of fasteners is near its end.

FIG. 5 is a cross sectional view of the feed apparatus of the present invention wherein the beginning of a second strip of fasteners is abutted to the end of the first strip of fasteners.

DETAILED DESCRIPTION OF THE PREFERRED EMBODIMENTS

Now referring to FIG. 1, feed mechanism 10 is used to feed fastener strip 14 into installation head 22 of installation apparatus 12. Installation apparatus 12 separates (or shears) one of the fasteners 14' from strip 14 and joins it to panel 18. The method of joining fastener 14' to panel 18 is generally accomplished by piercing fastener 14' through panel 18 and, thereafter, deforming a portion of fastener 14' and/or panel 18, thereby causing it to engage panel 18 in a way which securely joins fastener 14' to panel 18. FIG. 3 shows a completed installation of fastener 14' in panel 18. U.S. Pat. Nos. 2,707,322 and 3,648,747 both disclose methods of installing fasteners, namely pierce nuts, in metal panels.

In mass production applications, installation apparatus 12 is normally located in a die press (not shown) capable of generating several tons of force. Installation apparatus 12 reciprocates vertically 24. On the downward stroke of reciprocation 24, punch 26 separates fastener 14' from fastener strip 14 and forces it through panel 18. Die 20 receives fastener 14' and deforms fastener 14' in a way which causes fastener 14' to positively engage and retain panel 18. On the upward stroke, feed mechanism 10 places the next fastener 14" beneath punch 26 thereby readying installation apparatus 22 for the next fastener installation into panel 18.

Fastener strip 14 is typically supplied to feed mechanism 10 by way of reel 16. Fastener strip 14 is comprised of a plurality of individual fasteners, each of which are joined together in a common orientation. FIG. 2 discloses one preferred method of joining a plurality of fasteners to form a fastener strip. In this preferred embodiment, individual fasteners are joined by one or more wires 28. U.S. Pat. No. 3,845,860 discloses a method and apparatus for forming a strip of fasteners by using a wire carrier. Other techniques for generating strips of fasteners may work equally well.

Feed mechanism 10 is comprised of forward pawl assembly 30 and rearward pawl assembly 32. Forward pawl assembly 30 is comprised of housing 34 which is fixed relative to chute 36. Forward pawl 40 is connected to rearward pawl assembly 32 by way of shaft 42. Pawl 40 is connected to plate 44 by way of pivot pin 46. Thus, forward pawl 40 is pivotally connected to plate 44. Roller wheel 48 is connected to plate 44 and freely rotates about axis 50.

When installation apparatus 12 reciprocates 24 in the manner which has already been described, ramped surface 54 of drive block 52 engages roller wheel 48 and causes forward pawl 40 to horizontally reciprocate 56. Because shaft 42 connects plate 44 and rearward pawl assembly 32, rearward pawl assembly reciprocates 56 in synchronism with forward pawl assembly 30. Feed bias spring 58 biases wheel or roller 48 against ramp surface 54. Accordingly, the upward movement of installation apparatus 12 causes forward and rearward pawl assemblies 30, 32 to move toward punch 26 and the downward movement of installation apparatus 12 causes forward and rearward pawl assemblies 30, 32 to move away from punch 26. Rearward pawl assembly 32 is loosely coupled to chute 36 thereby enabling it to freely, horizontally reciprocate as demanded by shaft 42.

Although forward pawl 40 is pivotally connected to plate 44 by way of pivot pin 46, its pivotal motion is limited, in the counter-clockwise direction, by the presence of stop block 60. Forward pawl 40 is biased against stop block 60 by way of forward pawl bias spring 62. Forward pawl 40 includes, at its lower end, finger 64. Finger 64 is appropriately sized to engage a portion (such as an aperture, etc.) of a fastener in fastener strip 14.

As installation apparatus 12 reciprocates 24, this reciprocating motion drives feed mechanism 10 such that forward pawl assembly 30 shuttles (horizontally forward and backward) in synchronism with the vertical reciprocations of installation apparatus 12. During the first half of its reciprocal movement, forward pawl 40 moves away from punch 26, compressing spring 62 and allowing finger 64 to skip along top of a fastener in fastener strip 14. This skipping movement does not exert enough force to move strip 14. During the second half of its reciprocal movement, when assembly 30 moves towards punch 26, finger 64 engages a portion of one of the fasteners in fastener strip 14 and the urging of feed bias spring 58 acting through finger 64 moves fastener strip 14 toward punch 26. Thus, feed mechanism 10 converts reciprocal vertical 24 motion into a unilateral, horizontal force which moves fastener strip 14 from reel 16 into installation apparatus 12.

Rearward pawl assembly 32 is comprised of rearward pawl 66, which is pivotally connected to rearward pawl housing 72 by way of pivot pin 68. The pivotal movement of rearward pawl 66 is limited in the same manner as that described for forward pawl 40 in that its counter-clockwise movement is limited by surface 74 of rearward pawl housing 72. Rearward pawl bias spring 70 operates to allow finger 76 of rearward pawl 66 to skip across fastener strip 14 when rearward pawl 66 moves away from punch 26 and causes finger 76 to engage a fastener of fastener strip 14 when rearward pawl 66 moves towards punch 26. Thus, as will now be understood, that the operation of rearward pawl assembly 32 is identical to, and in horizontal synchronism with, forward pawl assembly 30.

Now referring to FIG. 4 of the drawings, in conventional single pawl feed systems, once the end 78 of fastener strip 14 progresses past finger 64 of forward pawl 40, feed mechanism 10 can no longer push fastener strip 14 into installation head 22. Thus, in conventional single pawl feed systems, the operator must stop the operation of the machine, feed a new fastener strip 14 into chute 36, and then commence operation. In mass production environments, the starting and stopping of an operation to load the next strip of fasteners is a highly inefficient use of time. However, in addition to these drawbacks, another disadvantage is associated with single pawl feeders. This undesirable condition is known as the "half nut" condition. This condition exists when end 78 of strip 14 is just beyond forward pawl 40. Under these conditions, pawl 40 will push strip 14 towards punch 26, however, because there is, in effect, a fastener missing (no new fastener strip has been fed in yet), the existing fastener strip 14 is advanced approximately one half its normal distance. Thus, one can easily understand from FIG. 4, that once fastener 14' is removed from strip 14, finger 64 will only advance strip 14 approximately one-half of its normal travel by virtue of not having a fastener to properly engage. Under these conditions, punch 26 will simply shear a partially exposed nut from strip 14 thereby possibly damaging installation head 22 and panel 18. Thus, it will now be shown that the undesirable side effects associated with a single pawl feed system are overcome by the dual feed pawl system of the present invention.

Now referring to FIG. 5, whenever the last fastener 78 in a strip of fasteners 14 falls between forward pawl 40 and rearward pawl 66, the feed mechanism of the present invention allows subsequent fastener strip 15 to be fed into chute 36 and forced past rearward pawl 66. In the manner which has already been described, rearward pawl 66 will pivot clockwise thereby riding over fastener strip 15 as fastener strip 15 is pushed through chute 36. Fastener strip 15 is pushed through chute 36 until first nut 14''' abuts last nut 78. Once this abutting relationship is established, the synchronous operation of forward pawl 40 and rearward pawl 66 guarantee that the half nut condition will not take place and the operation of installation apparatus 12 will continue, uninterrupted, from fastener strip 14 to subsequent fastener strip 15. An "electric eye," proximity sensors, or any other conventional means may be employed to sense end 78 of fastener strip 14 and indicate the sensed condition to the machine operator. This indication will give the operator sufficient time to remove empty reel 16 and load and thread a full reel. The placement of the sensor will be a function of the lead time needed to swap reels. Some of the factors to consider when determining necessary lead time are the speed at which the fasteners are being installed, the skill of the operator, and the difficulty associated with swapping reels.

Having described the preferred embodiments of the feed mechanism of the present invention, it will be understood that various modifications or additions may be made to the preferred embodiment chosen here to illustrate the present invention without departing from the spirit of the present invention. For example, even though the feed mechanism has been shown feeding nut type fasteners, it is contemplated that any type of continuously joined fasteners can be fed by the feed mechanism of the present invention. Also, the feed mechanism has been shown for use in conjunction with a fastener installation head. This approach was taken primarily because feed mechanisms of this type are commonly used in conjunction with fastener installation heads; however, feed mechanisms may be used in conjunction with any type of material handling system, and accordingly, the feed mechanism of the present invention is not solely limited to feeding materials into an installation head for installation onto a panel.

Accordingly, it is to be understood that the subject matter sought to be afforded protection thereby shall be deemed to extend to the subject matter defined in the appended claims, including all fair equivalents thereof.

I claim:

1. A feed apparatus for feeding linear strips of fasteners to a fastener installation head, said strips of fasteners each comprising a plurality of interconnected fasteners, said feed apparatus adapted to feed a second strip of fasteners to said installation head as a first strip of fasteners received in said installation head is nearly exhausted, said feed apparatus comprising:

a feed passage supporting and guiding said strips of fasteners from an inlet to said installation head;

a reciprocating rod member located above and reciprocably supported generally parallel to said feed passage;

a first feed pawl pivotally supported on said rod member, adjacent said installation head, having a free end adapted to engage at least one fastener of said first strip of fasteners in said feed passage, and spring means normally biasing said first feed pawl free end into engagement with said first strip of fasteners;

a second feed pawl pivotally supported on said rod member, spaced from said from said first feed pawl a distance equal to the length of several of said fasteners in said feed passage, said second feed pawl having a free end adapted to engage at least one fastener of a strip of fasteners in said feed passage and spring means independently biasing said second pawl free end into engagement with said strip of fasteners, said second feed pawl adapted to receive said second strip of fasteners as said first strip of fasteners is exhausted; and drive means reciprocating said rod member and causing said first and second feed pawls to reciprocate along said feed passage to feed said strips of fasteners to said installation head.

2. The feed apparatus defined in claim 1, characterized in that said apparatus includes a feed bias spring biasing said rod toward said installation head.

3. The installation head defined in claim 1, characterized in that said installation head includes a plunger reciprocating generally transverse to said feed passage, said plunger installing a fastener with each stroke of said plunger, and said rod coupled to said installation head and adapted to reciprocate in synchronism with said plunger.

4. A feed apparatus for feeding linear strips of fasteners to an installation head, said strips of fasteners each comprising a plurality of interconnected fasteners, said feed apparatus adapted to feed a second strip of fasteners to said installation head as a first strip of fasteners received in said installation head is nearly exhausted, said feed apparatus comprising:

a feed passage supporting and guiding said strips of fasteners from an inlet to said installation head;

a reciprocating rod member located above and reciprocably supported generally parallel to said feed passage;

a first feed pawl pivotally supported on said rod member, adjacent said installation head, having a free end adapted to engage at least one fastener of said first strip of fasteners in said feed passage;

a second feed pawl pivotally supported on said rod member spaced from said first feed pawl a distance equal to the length of several of said fasteners in said feed passage, said second feed pawl having a free end adapted to engage at least one fastener of a strip of fasteners in said feed passage;

spring means normally biasing said rod toward said installation apparatus to move said feed pawls toward said installation head, thereby moving said fasteners toward said installation head and drive means driving said rod away from said installation head during installation of a fastener, said spring and drive means thereby reciprocating said rod;

said first feed pawl feeding said first strip of fasteners to said installation head and said second pawl receiving and feeding a second strip of fasteners as said first strip of fasteners is nearly exhausted.

5. A feed apparatus defined in claim 4, characterized in that each of said feed pawls includes a spring means normally biasing said free ends of said first and second feed pawls toward said strip of fasteners in said feed passage.

6. The feed apparatus defined in claim 4, characterized in that said installation apparatus includes a plunger reciprocating generally perpendicular to said feed passage to install a fastener from said first strip of fasteners, and said rod coupled to said installation head and adapted to reciprocate in synchronism with the reciprocation of said plunger.

* * * * *